United States Patent
Lee et al.

(10) Patent No.: US 11,479,113 B2
(45) Date of Patent: Oct. 25, 2022

(54) FUEL DOOR OPENER ASSEMBLY

(71) Applicants: HYUNDAI MOTOR COMPANY, Seoul (KR); KIA MOTORS CORPORATION, Seoul (KR); PYEONG HWA AUTOMOTIVE CO., LTD., Daegu (KR)

(72) Inventors: Seong-Muk Lee, Yongin-si (KR); Kyoung-Hoon Park, Suwon-si (KR)

(73) Assignees: HYUNDAI MOTOR COMPANY, Seoul (KR); KIA MOTORS CORPORATION, Seoul (KR); PYEONG HWA AUTOMOTIVE CO., LTD., Daegu (KR)

(*) Notice: Subject to any disclaimer, the term of this patent is extended or adjusted under 35 U.S.C. 154(b) by 261 days.

(21) Appl. No.: 16/696,122

(22) Filed: Nov. 26, 2019

(65) Prior Publication Data
US 2020/0189386 A1 Jun. 18, 2020

(30) Foreign Application Priority Data
Dec. 18, 2018 (KR) .......................... 10-2018-0164002

(51) Int. Cl.
*B60K 15/05* (2006.01)
*E05C 1/00* (2006.01)
(Continued)

(52) U.S. Cl.
CPC .............. *B60K 15/05* (2013.01); *E05B 83/34* (2013.01); *E05C 1/002* (2013.01); *E05C 19/022* (2013.01);
(Continued)

(58) Field of Classification Search
CPC ............ B60K 15/05; B60K 2015/0561; B60K 2015/0576; B60K 2015/0584;
(Continued)

(56) References Cited

U.S. PATENT DOCUMENTS 4,482,175 A * 11/1984 Sugie .................... E05C 19/022
 292/198
4,660,871 A * 4/1987 Arakawa ............... E05C 19/022
 292/81
(Continued)

FOREIGN PATENT DOCUMENTS

CN 112832604 A * 5/2021
DE 9412661 U1 * 10/1994 .......... E05C 19/022
(Continued)

OTHER PUBLICATIONS

English Translation for WO 2010/056062 A2, https://worldwide.espacenet.com/ (Year: 2021).*
(Continued)

*Primary Examiner* — Alyson M Merlino
(74) *Attorney, Agent, or Firm* — Lempia Summerfield Katz LLC (57) ABSTRACT

A fuel door opener assembly is configured to lock or unlock a fuel door of a vehicle and includes: an opener housing in which a space is formed; a locking block slidably installed inside the opener housing, elastically supported in a direction to be drawn out from the opener housing, and configured to lock and unlock the fuel door; a locking pin configured to be moved along a heart-shaped cam formed on the locking block to restrict a location of the locking block in accordance with a position thereof on a profile of the heart-shaped cam; and an elastic member disposed in the opener housing and elastically supporting the locking pin to allow the locking pin to be positioned on the profile of the heart-shaped cam.

7 Claims, 9 Drawing Sheets

(51) Int. Cl.
  *E05C 19/02* (2006.01)
  *E05B 83/34* (2014.01)
(52) U.S. Cl.
  CPC .... *B60K 2015/0584* (2013.01); *E05C 19/028* (2013.01)
(58) Field of Classification Search
  CPC ... E05C 1/002; E05C 1/00; E05C 1/02; E05C 1/06; E05C 19/02; E05C 19/022; E05C 19/028; E05B 83/34; Y10T 292/0911; Y10T 292/0926; Y10T 292/093; Y10T 292/0934; Y10T 292/0928; Y10T 292/0945; Y10T 292/0936; Y10T 292/0947; Y10T 292/0948; Y10T 292/096; Y10T 292/0969; Y10T 292/097; Y10T 292/0976; Y10T 292/0977; Y10T 292/098; Y10T 292/0997; Y10T 292/0999; Y10T 292/10; Y10T 292/1001; Y10T 292/1002; Y10T 292/1016; Y10T 292/1022; Y10T 292/1023; Y10T 292/1024; Y10T 292/1028; Y10T 292/103; Y10T 292/696; Y10S 292/04; Y10S 292/11
  See application file for complete search history.

(56) References Cited

U.S. PATENT DOCUMENTS

| | | | |
|---|---|---|---|
| 10,767,400 B2 * | 9/2020 | Sonobe | E05B 83/34 |
| 2018/0266151 A1 * | 9/2018 | Sonobe | E05B 83/34 |
| 2020/0123817 A1 * | 4/2020 | Inose | E05B 83/34 |

FOREIGN PATENT DOCUMENTS

| | | | | |
|---|---|---|---|---|
| GB | 2117472 A | * | 10/1983 | E05C 19/022 |
| KR | 830002789 Y1 | * | 12/1983 | |
| KR | 20100016827 A | | 2/2010 | |
| WO | WO-2009000672 A1 | * | 12/2008 | E05C 19/022 |
| WO | WO-2010056062 A2 | * | 5/2010 | E05C 19/022 |
| WO | WO-2019088183 A1 | * | 5/2019 | E05B 83/34 |
| WO | WO-2019167869 A1 | * | 9/2019 | B60K 15/05 |

OTHER PUBLICATIONS

Computer-Generated Translation for WO 2009/000672, Generated on Oct. 21, 2021, https://worldwide.espacenet.com/ (Year: 2021).*

* cited by examiner

FUEL DOOR OPENER ASSEMBLY

CROSS-REFERENCE TO RELATED APPLICATIONS

This application claims priority to Korean Patent Application No. 10-2018-0164002, filed on Dec. 18, 2018, which is incorporated herein by reference in its entirety.

BACKGROUND OF THE DISCLOSURE

Field of the Disclosure

The present disclosure relates to a fuel door opener assembly of a vehicle provided for opening a fuel door, which is opened in a push-popup manner, and more particularly, to a fuel door opener assembly configured to prevent a fuel door from being opened by a load applied from the outside.

Description of Related Art

A fuel door of a vehicle is opened by a fuel door opener assembly.

One of the existing fuel door opener assemblies' functions in a push-popup manner. When a driver pushes a fuel door for opening the fuel door, the fuel door is popped up to be unlocked and when the driver just pushes the fuel door for closing the fuel door, the fuel door is locked.

Figure 1:
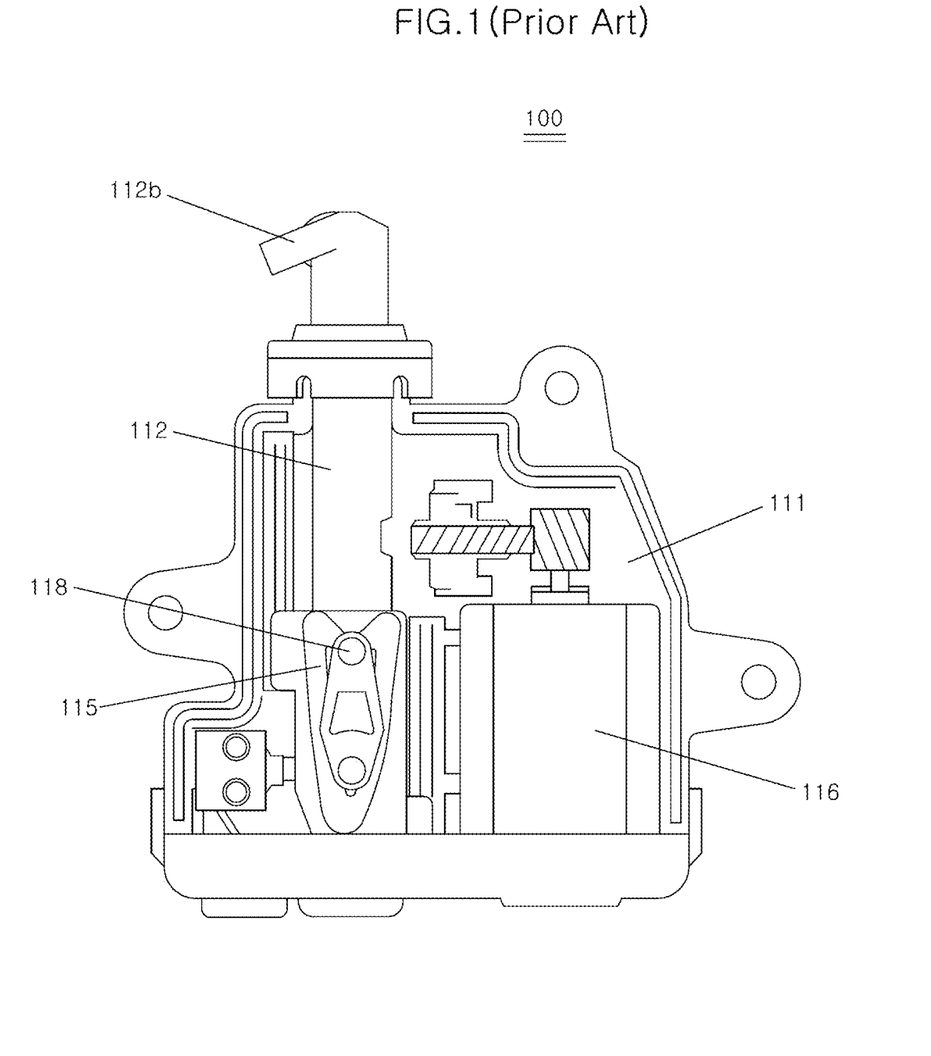
FIG. 1 is a view illustrating a fuel door opener assembly according to the prior art.
Figure 2:
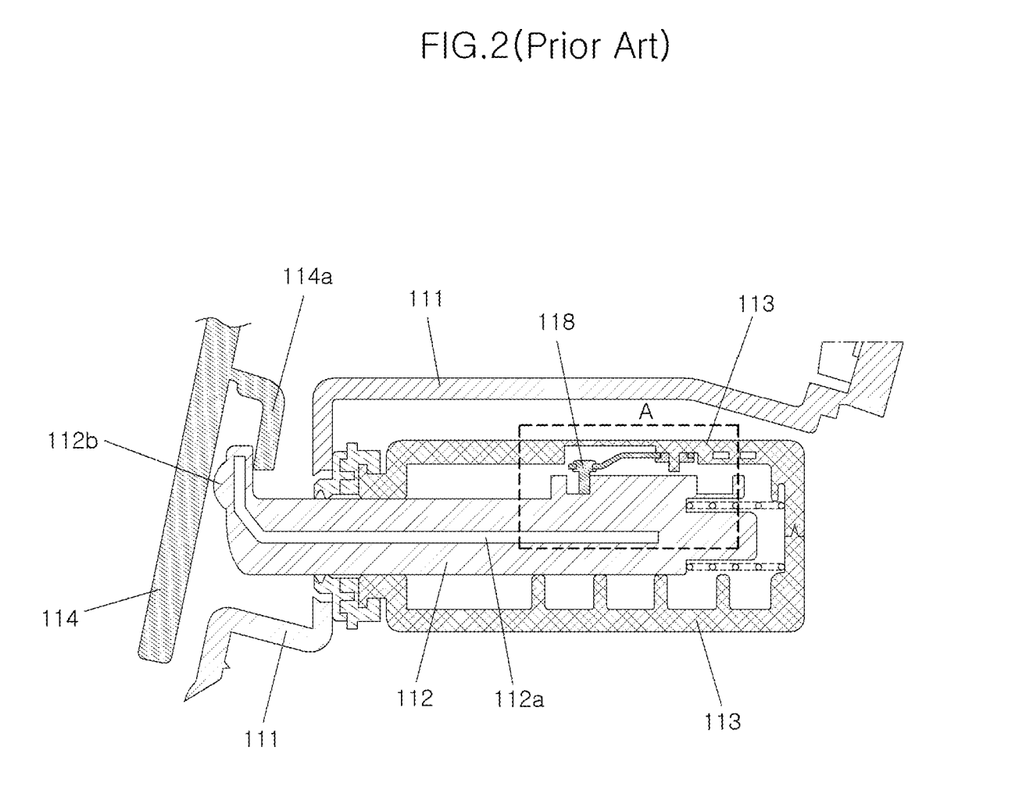
FIG. 2 is a cross-sectional view of the fuel door opener assembly of FIG. 1 according to the prior art.
Figure 3:
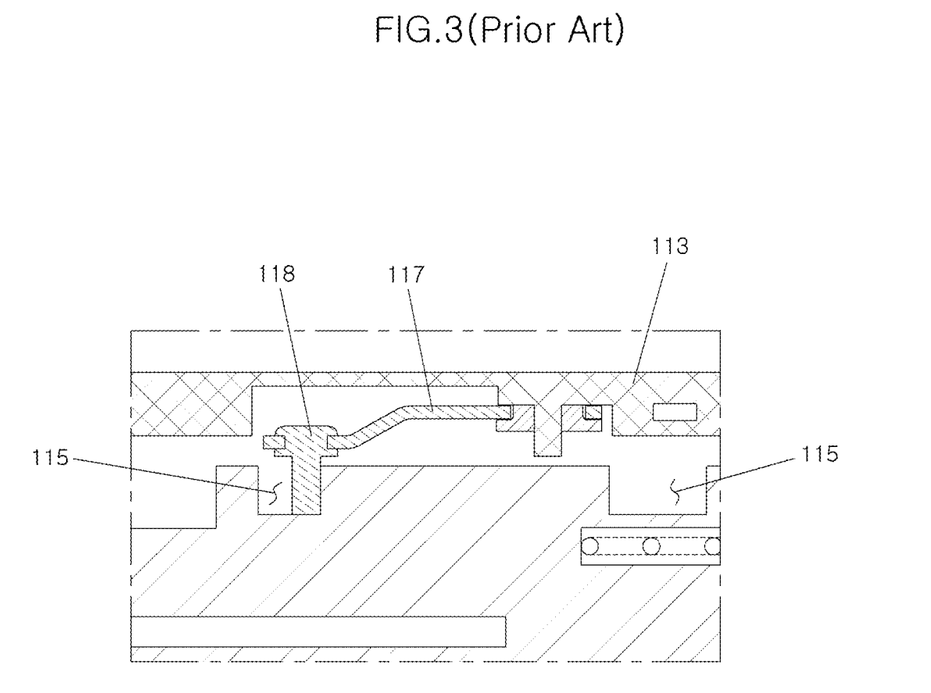
FIG. 3 is an enlarged view of the portion "A" of FIG. 2.

In a fuel door opener assembly 100 as illustrated in FIGS. 1 and 2, a fuel door 14 is installed on a door housing 111 to be opened and closed. A locking block 112 configured to restrain or release the fuel door 114 is installed inside an opener housing 113. The locking block 112 is slidably installed inside the opener housing 113 and is installed to be elastically supported on the opener housing 113 by a spring. A locking portion 112b is formed at a front end of the locking block 112 to be engaged with a hook 114a formed on an inner surface of the fuel door 114. In a state in which the locking block 112 is inserted into the opener housing 113 and the fuel door 114 is closed, when the locking portion 112b is engaged with the hook 114a, the fuel door 114 is kept in a locked state. In a locking state of the fuel door 114 as shown in FIG. 3, a locking pin 118 is inserted into a heart-shaped cam 115 formed on the locking block 112.

The locking block 112 is locked or unlocked by a driver. When the driver pushes the fuel door 114 in the unlocked state, while the locking pin 118 is moved from a locking section to a release section of the heart-shaped cam 115, the locking block 112 is drawn out from the opener housing 113. The fuel door 114 is thus popped-up and then opened.

The locking block 112 is restrained not to be moved by a driving motor 116 when the fuel door 114 is closed.

Figure 4:
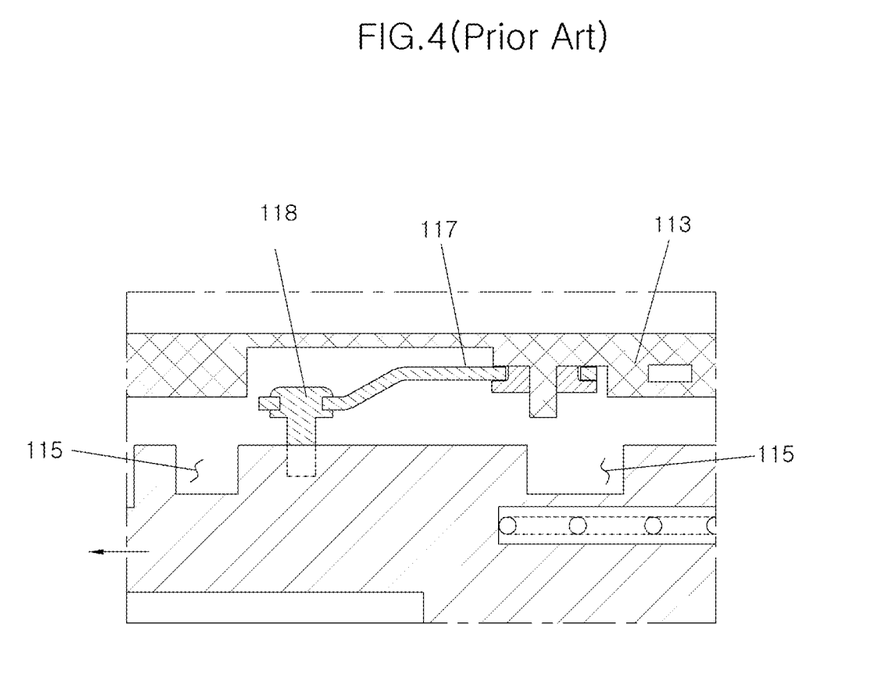
FIG. 4 is a cross-sectional view illustrating a state in which a locking pin of FIGS. 2 and 3 is detached from a heart-shaped cam.
Figure 5:
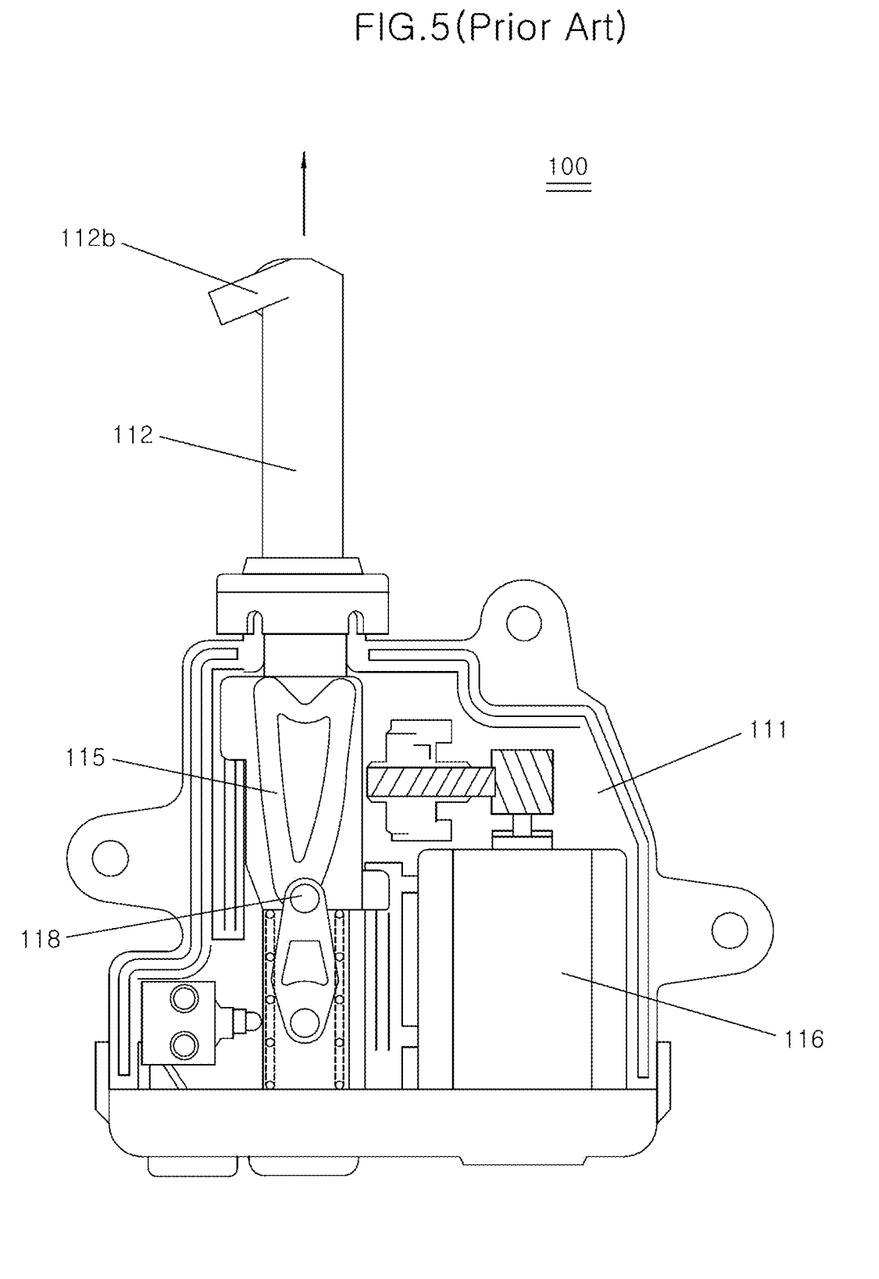
FIG. 5 is a view illustrating a state in which the fuel door opener assembly of FIG. 1 according to the prior art is opened.
Figure 6:
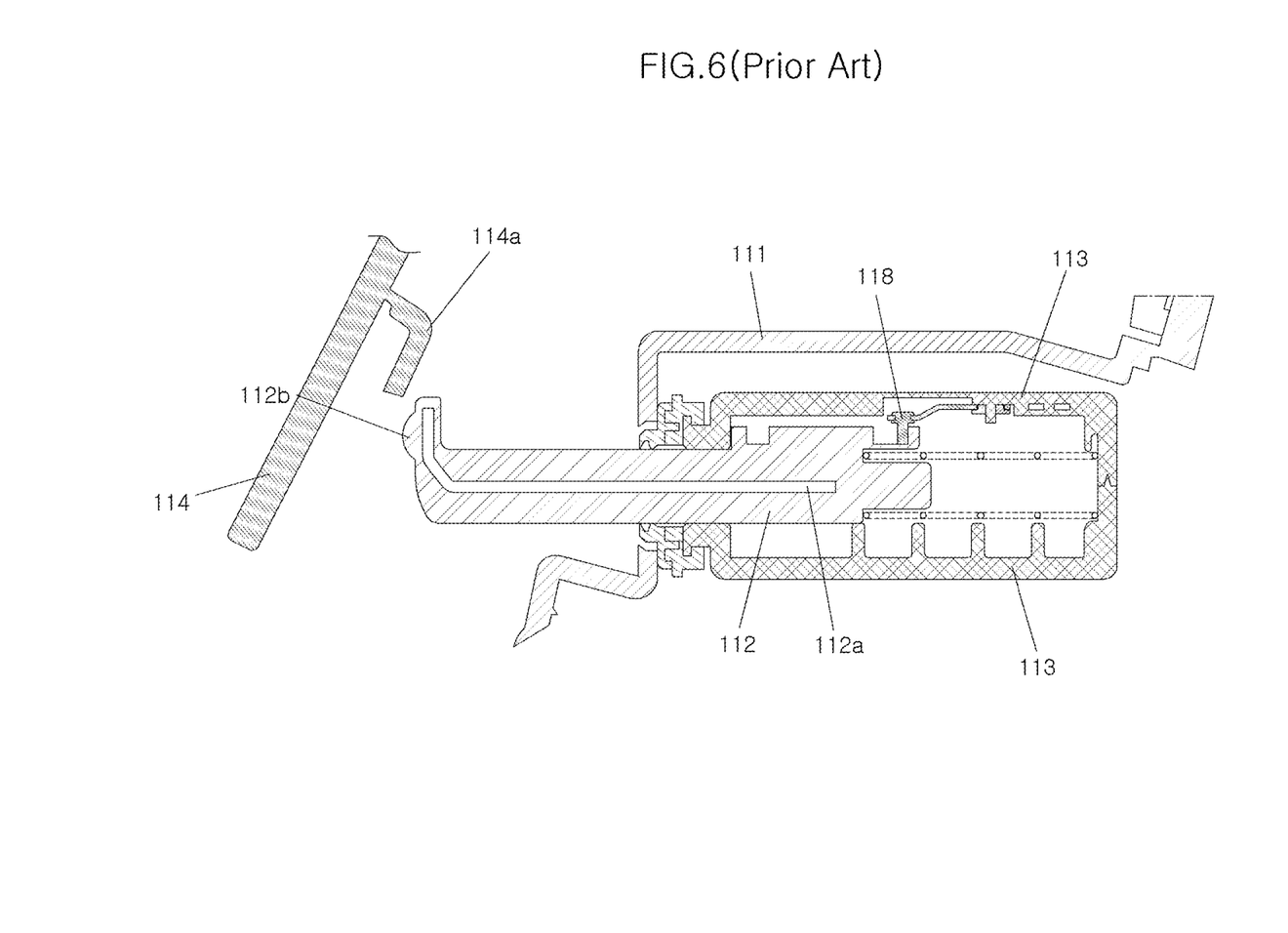
FIG. 6 is a cross-sectional view illustrating a state in which the fuel door opener assembly of FIG. 5 according to the prior art is opened.

When someone pushes the outside of the fuel door 114, the locking block 112 is moved upward. The locking pin 118 is moved from the locking section to the release section on the heart-shaped cam 115 as the locking block 112 is moved upward (See FIG. 4). When the locking pin 118 is moved to the release section of the heart-shaped cam 115, the locking pin 118 is drawn out from the opener housing 113 by an elastic force of the spring and a locking of the fuel door 114 is released. As a result, the fuel door 114 is opened.

Figure 7:
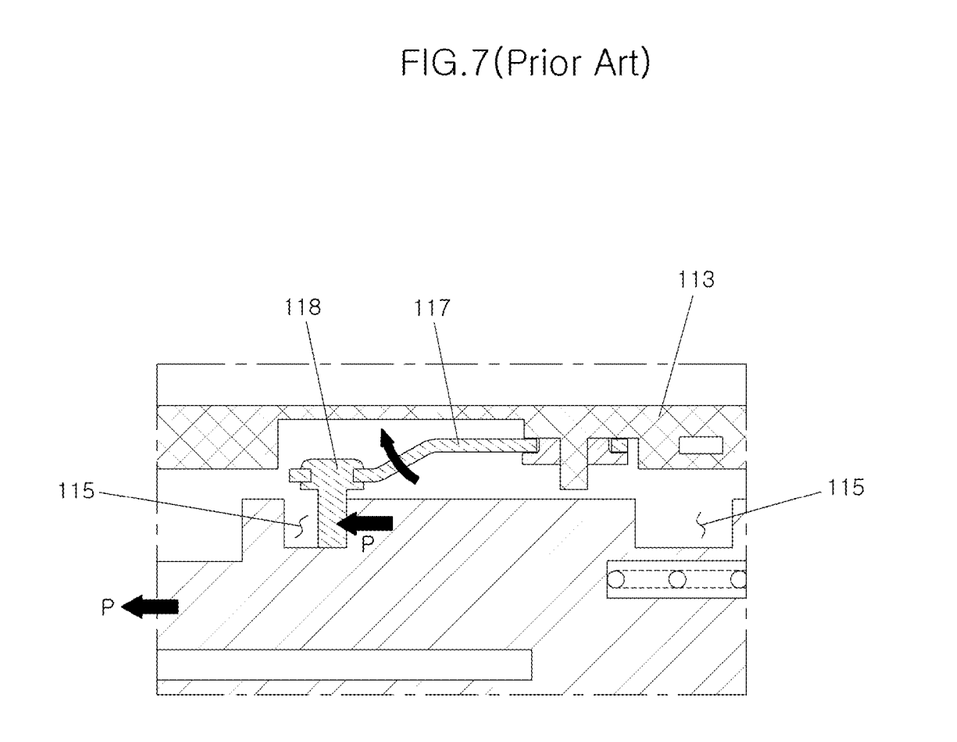
FIG. 7 is a cross-sectional view illustrating a state in which the fuel door opener assembly of FIG. 5 according to the prior art is forcibly opened.

On the other hand, in the fuel door opener assembly according to the prior art, when someone attempts to forcibly open the fuel door 114 from the outside, a locking state of the fuel door 114 is released by an external force so that there is a possibility that the fuel door 114 is opened. In other words, as illustrated in FIG. 7, when the fuel door 114 is pulled outwardly from the outside, a pin plate 117 is deformed in a direction of the arrow in FIG. 7 by a load P that attempts to open the fuel door 114. The locking pin 118 is thus detached from the heart-shaped cam 115 and does not keep an engagement amount. Consequently, the fuel door 114 is likely to be opened.

Even when someone attempts to forcibly open the fuel door 114 from the outside, the fuel door 114 should be kept in a closed stated. As described above, however, when the force P for forcibly opening the fuel door 114 is applied, the pin plate 117 is deformed, and there is a possibility that the fuel door 114 is opened.

The contents described in the Description of Related Art section are to help understand the background of the present disclosure. The Description of Related Art section may include information that is not previously known to those having ordinary skill in the art to which the present disclosure pertains.

SUMMARY OF THE DISCLOSURE

The present disclosure is devised to solve the above-mentioned problems. An object of the present disclosure is to provide a fuel door opener assembly that operates in a push-popup manner and prevents a plate provided for locking a fuel door from being deformed even when a load is applied from the outside. The fuel door opener assembly of the present disclosure thereby prevents the fuel door from being forcibly opened.

In order to achieve the above object, a fuel door opener assembly according to the present disclosure is configured to lock or unlock a fuel door of a vehicle. The fuel door opener assembly may include an opener housing in which a space is formed a locking block slidably installed inside the opener housing. The locking block may be elastically supported in a direction to be drawn out from the opener housing and configured to lock and unlock the fuel door The fuel door opener assembly may also include a locking pin configured to be moved along a heart-shaped cam formed on the locking block to restrict a location of the locking block in accordance with a position thereof on a profile of the heart-shaped cam. The fuel door opener assembly may further include an elastic member disposed in the opener housing and elastically supporting the locking pin to allow the locking pin to be positioned on the profile of the heart-shaped cam.

The elastic member may be a leaf spring having one end disposed to an inner surface of the opener housing and having another end fixed to one side of the locking pin.

The leaf spring may be formed to be extended from an inner surface of the opener housing towards the locking block and to be extended in a longitudinal direction of the locking block at a portion fixed to the locking pin.

A receiving recess configured to receive the leaf spring therein may be formed on the opener housing.

The opener housing may have an engaging protrusion formed on one side of the receiving recess to prevent the locking pin from be detached from the profile of the heart-shaped cam when the other end of the leaf spring is moved upward.

The fuel door opener assembly may further include a pin plate provided on an inner surface of the opener housing to couple the locking pin to the opener housing.

One end of the pin plate may be fixed to the inside of the opener housing and the other end may be fixed to the locking pin.

The pin plate may be installed to be in parallel with the locking block.

The leaf spring and the pin plate may be fixed to the locking pin in a state in which the leaf spring and the pin plate are in contact with each other at the locking pin.

The elastic member may be a leaf spring having one end disposed to an inner surface of the opener housing and having another end fixed to one side of the pin plate.

DETAILED DESCRIPTION OF SPECIFIC EMBODIMENTS

Hereinafter, a fuel door opener assembly according to the present disclosure is described in detail with reference to the accompanying drawings. However, in the following description and the accompanying drawings, a detailed description of well-known functions or configurations that can obscure the subject of the present disclosure has been omitted.

Figure 8:
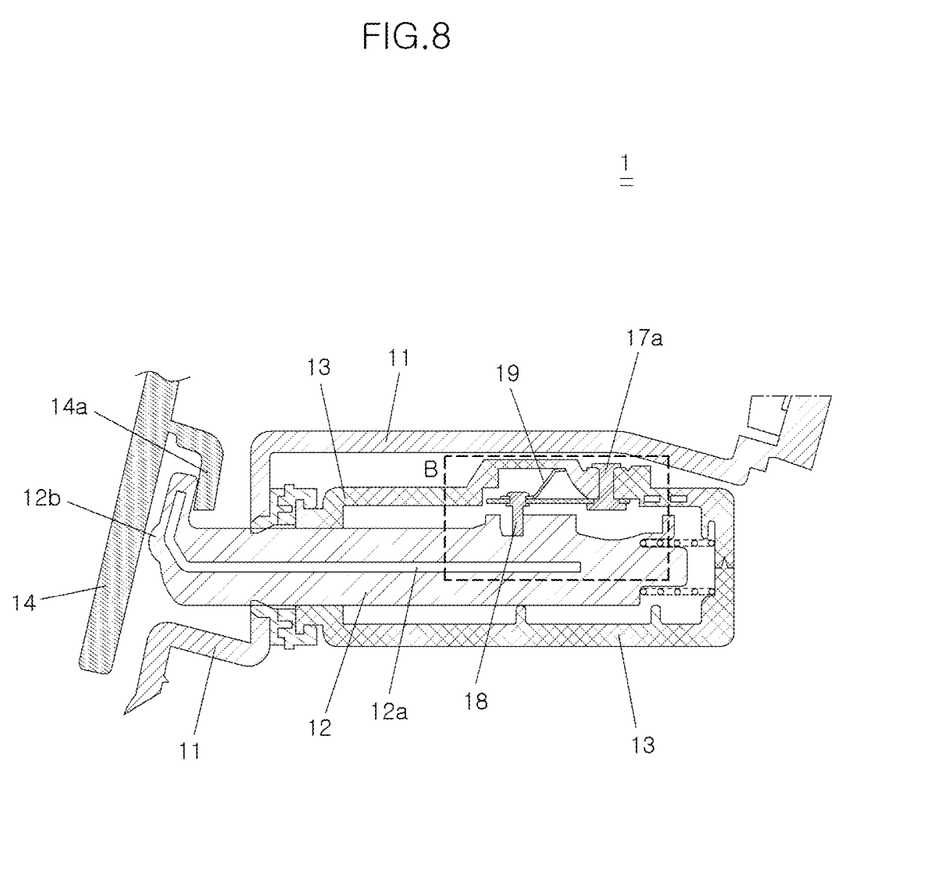
FIG. 8 is a cross-sectional view illustrating a fuel door opener assembly according to the present disclosure.
Figure 9:
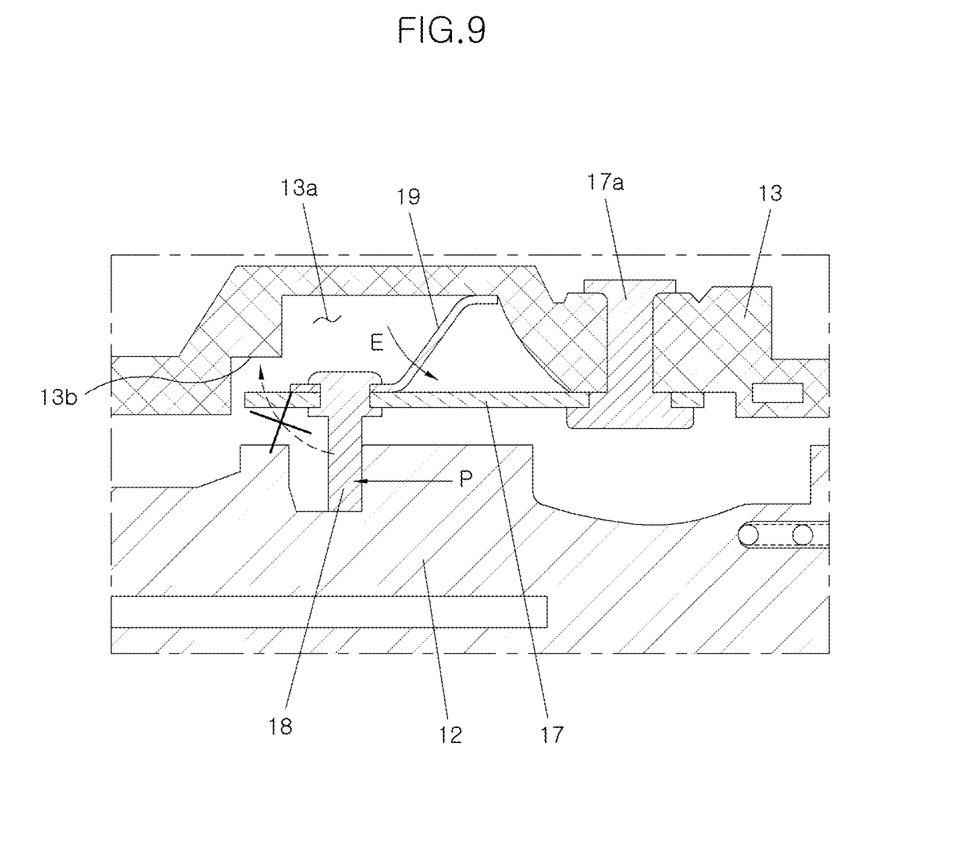
FIG. 9 is an enlarged view of the portion "B" of FIG. 8.

A fuel door opener assembly 1 according to the present disclosure is configured to lock or unlock a fuel door 14 of a vehicle. The fuel door opener assembly 1 includes an opener housing 13, in which a space is formed, and a locking block 12 slidably installed inside the opener housing 13. The locking block 12 is elastically supported in a direction to be drawn out from the opener housing 13 and is configured to lock and unlock the fuel door 14. The fuel door opener assembly 1 also includes a locking pin 18 configured to be moved along a heart-shaped cam 15 formed on the locking block 12 to restrict a location of the locking block 12 in accordance with a position thereof on a profile of the heart-shaped cam 15. In this example, the fuel door opener assembly 1 further includes an elastic member 19 disposed in the opener housing 13 and elastically supporting the locking pin 18 to allow the locking pin to be positioned on the profile of the heart-shaped cam 15.

The fuel door 14 is openable and closable and installed on a vehicle body at a portion where a fuel inlet of a vehicle is installed.

The fuel door opener assembly 1 is installed to lock or unlock the fuel door 14 and to allow the fuel door to be popped-up when unlocked.

The fuel door opener assembly 1 is installed inside a door housing 11 on which the fuel door 14 is installed.

The opener housing 13 is formed into a cylindrical shape having a space formed therein and is installed inside the door housing 11. The opener housing 13 is formed to have a configuration in which a portion thereof adjacent to the fuel door 14 is opened and the opposite portion is closed. The opener housing 13 may be made of synthetic resin or the like and may include two or more members and may be formed by coupling these members to each other. An inlet of the opener housing 13, i.e., the opened end portion of the opener housing 13, is fixedly installed on the door housing 11.

The locking block 12 is configured to lock or unlock the fuel door 14. The locking block 12 is formed in a state in which an insert 12a is inserted therein. A locking portion 12b is formed at a front end of the locking block 12 to be engaged with a hook 14a formed on an inner surface of the fuel door 14. Therefore, when the locking portion 12b and the hook 14a are engaged with each other, the fuel door 14 becomes in a locked state and the fuel door 14 is kept in a closed state. The locking block 12 is slidably installed inside the opener housing 13. Since the locking block 12 is slidably installed inside the opener housing 13, when the locking block 12 is inserted into the opener housing 13, the locking block 12 locks the fuel door 14. Also, when the locking block 12 is drawn out from the opener housing 13, the locking block 12 unlocks the fuel door 14 to enable the fuel door 14 to be opened.

The locking block 12 is installed inside the opener housing 13 in a state of being elastically supported. A spring (not numbered) is mounted between the locking block 12 and the opener housing 13 to elastically support the locking block 12 in the direction in which the locking block 12 is pulled out.

The heart-shaped cam 15 is formed on the locking block 12.

The locking pin 18 is located inside the heart-shaped cam 15 to allow the locking block 12 to be locked or unlocked in accordance with a location of the locking pin 18 on a profile of the heart-shaped cam 15.

In the present disclosure, the elastic member 19 is provided to allow the locking pin 18 to be elastically supported with respect to the profile of the heart-shaped cam 15.

The elastic member 19 elastically supports the locking pin 18 with respect to the profile of the heart-shaped cam 15 (see arrow E in FIG. 9) to prevent the locking pin 18 from being detached from the profile of the heart-shaped cam 15.

The locking pin 18 is installed inside the opener housing 13 through a pin plate 17. The elastic member 19 is additionally installed to elastically support the locking pin 18 with respect to the heater cam 15. One end of the pin plate 17 is fixed to the opener housing 13 and the other end fixes the locking pin 18. More specifically, one end of the pin plate 17 may be inserted into the opener housing 13 or may be fixed to the opener housing by a fastening bolt 17a.

The elastic member 19 is provided in the form of a leaf spring 19 and is additionally placed above the pin plate 17 to elastically support the locking pin 18 with respect to the heart-shaped cam 15. One end of the leaf spring 19 is secured to an inner surface of the opener housing 13 and the other end is disposed or coupled to the locking pin 18 or the pin plate 17. The leaf spring 19 has a configuration in which a portion thereof is protruded from one end towards the locking block 12 and a portion thereof to which the locking pin 18 is coupled is formed to be in parallel with the locking block 12.

More specifically, the leaf spring 19 is installed in a state where the leaf spring is overlapped with the pin plate 17 at a portion where the leaf spring is fastened to the locking pin 18.

Also, the opener housing 13 has a receiving recess 13a formed therein to enable the leaf spring 19 to be installed therein. A portion of the opener housing 13 is protruded towards the outside of the opener housing 13 to allow the receiving recess 13a to be formed on the inner surface of the opener housing 13.

Furthermore, an engaging protrusion 13b is formed on one side of the receiving recess 13a. This allows an upward movement of the other end of the pin plate 17 to be secondarily restricted even when the locking pin 18 is detached from the heart-shaped cam 15 due to an external force acting on the locking pin despite the application of the leaf spring 19.

Since the other end of the pin plate 17 is positioned adjacent to the engaging protrusion 13b, even if the other end of the pin plate 17 is slightly lifted from a normal position, the engaging protrusion prevents the pin plate from be lifted. Therefore, the engaging protrusion 13b restricts an upward movement of the locking pin 18. Consequently, the engaging protrusion 13b restricts a movement of the locking pin from a locking position to a release position on the profile of the heart-shaped cam 15.

Operation of the fuel door opener assembly 1 according to the present disclosure having the above-described configuration is described as follows.

In the present disclosure, as illustrated in FIG. 8, when someone attempts to forcibly open the fuel door 14 from the outside, a load P acts on the locking block 12. Thus, the pin plate 17 tends to be deformed in a direction in which the locking block 12 is moved upward. However, the leaf spring 19 prevents the pin plate 17 from being deformed, so that the locking pin 18 is not detached from the profile of the heart-shaped cam 15 formed on the locking block 12.

By an elastic force of the leaf spring 19, the leaf spring 19 elastically supports the locking pin 18 in a direction represented by an arrow E in FIG. 9. This prevents the locking pin 18 from being detached from the profile of the heart-shaped cam 15.

Furthermore, the engaging protrusion 13b prevents the pin plate 17 from being deformed despite an action of the leaf spring 19. As a result, the locking pin 18 is not detached from the profile of the heart-shaped cam 15.

As described above, even if someone attempts to forcibly open the push-popup type fuel door 14 from the outside, it is possible to prevent a locking state between the fuel door 14 and the locking block 12 from be released.

According to the fuel door opener assembly of the present disclosure having the above-described configuration, even if an external load is applied, a deformation of the pin plate that locks the fuel door is prevented. Thus, it is possible to prevent the fuel door from being forcibly opened.

Although the present disclosure has been described with a focus on novel features of the present disclosure applied to various embodiments, it will be apparent to those having ordinary skill in the art that various deletions, substitutions, and changes in the form and details of the apparatus and method described above may be made without departing from the scope of the present disclosure. Accordingly, the scope of the present disclosure is defined by the appended claims rather than by the foregoing description. All modifications within the equivalent scope of the appended claims are embraced within the scope of the present disclosure.

What is claimed is:

1. A fuel door opener assembly configured to lock or unlock a fuel door of a vehicle, the fuel door opener assembly comprising:
   an opener housing in which a space is formed;
   a locking block slidably installed inside the opener housing, elastically supported in a direction to be drawn out from the opener housing, and configured to lock and unlock the fuel door;
   a locking pin configured to be moved along a heart-shaped cam formed on the locking block to restrict a location of the locking block in accordance with a position of the locking pin in a profile of the heart-shaped cam;
   an elastic member disposed in the opener housing and elastically supporting the locking pin to allow the locking pin to be positioned in the profile of the heart-shaped cam; and
   a pin plate provided on an inner surface of the opener housing to couple the locking pin to the opener housing,
   wherein the elastic member and the pin plate are fixed to the locking pin by at least a portion of the locking pin extending through the elastic member and the pin plate and the at least a portion of the locking pin gripping an upper surface of the elastic member and a lower surface of the pin plate.

2. The fuel door opener assembly of claim 1, wherein the elastic member is a leaf spring having one end disposed to an inner surface of the opener housing and another end having the upper surface gripped by the at least a portion of the locking pin.

3. The fuel door opener assembly of claim 2, wherein the leaf spring is formed to be extended from the inner surface of the opener housing towards the locking block and to be extended in a longitudinal direction of the locking block at the other end.

4. The fuel door opener assembly of claim 2, wherein the opener housing has a receiving recess formed therein to receive the leaf spring.

5. The fuel door opener assembly of claim 4, wherein the opener housing has an engaging protrusion formed on one side of the receiving recess to prevent the locking pin from being detached from the profile of the heart-shaped cam when the other end of the leaf spring is moved upward.

6. The fuel door opener assembly of claim 1, wherein the pin plate has one end fixed to an inside of the opener housing and another end having the lower surface gripped by the at least a portion of the locking pin.

7. The fuel door opener assembly of claim 6, wherein the pin plate is installed to be in parallel with the locking block.

* * * * *